318-135 SR 8-26-75 XR 3,902,084

United States Patent [19]

May, Jr.

[11] 3,902,084

[45] Aug. 26, 1975

[54] PIEZOELECTRIC ELECTROMECHANICAL TRANSLATION APPARATUS

[75] Inventor: William G. May, Jr., Penfield, N.Y.

[73] Assignee: Burleigh Instruments, Inc., East Rochester, N.Y.

[22] Filed: May 30, 1974

[21] Appl. No.: 474,831

[52] U.S. Cl. .................. 310/8.1; 310/8.3; 310/8.6; 310/9.1; 310/26; 318/116; 318/118; 318/135

[51] Int. Cl.$^{2}$ .................. H01L 41/04

[58] Field of Search .............. 310/8.1, 8.3, 8.5, 8.6, 310/9.1, 26; 318/116, 118, 135

[56] References Cited

UNITED STATES PATENTS

| | | | |
|---|---|---|---|
| 3,138,749 | 6/1964 | Stibitz | 310/26 X |
| 3,217,218 | 11/1965 | Steele | 318/118 |
| 3,377,489 | 4/1968 | Brisbane | 310/9.1 X |
| 3,389,274 | 6/1968 | Robertson | 310/8.6 X |
| 3,649,856 | 3/1972 | O'Neill | 318/135 X |
| 3,684,904 | 8/1972 | Galutva | 310/8.1 X |

*Primary Examiner*—Mark H. Budd
*Attorney, Agent, or Firm*—Martin LuKacher, Esq.

[57] ABSTRACT

The load actuating shaft of an inchworm translating device extends through a housing and is programmably movable over long distances with extremely fine resolution, in extremely small incremental steps by a piezoelectric driver which is referenced to the housing. The driver operates to clamp the shaft, and when a staircase voltage is applied to an element thereof, translates the shaft in a direction and over an incremental distance related to the polarity and amplitude of the steps of the staircase voltage. Staircase voltage cycles may be repeated to move the shaft incrementally over a long distance.

17 Claims, 11 Drawing Figures

PIEZOELECTRIC ELECTROMECHANICAL TRANSLATION APPARATUS

The present invention relates to electromechanical translators and particularly to those translators which are capable of motion in incremental steps and which are known as "inchworms".

The present invention is especially sutable for use in linear actuators and positioners where precision travel is required over relatively long distances. The invention may also be used in any application requiring step motion, as where stepper motors have been used.

Propulsion devices have been proposed in which an element is advanced as by peristaltic action. Such action has been obtained piezoelectrically as by causing successive portions of a piezoelectric element, which itself is advanced, to contract or expand. While such a piezoelectric element is useful the motion is not smooth, where each motion increment is the sum of a forward and a reverse motion.

It is an object of this invention to provide improved electromechanical translation apparatus which affords translation of loads over relatively long distances, with extremely fine and smooth resolution and which is also capable of moving relatively heavy loads.

It is another object of the present invention to provide improved electromechanical translators which are capable of moving and positioning loads over long distances of travel precisely with extremely high resolution at any desired position over such travel distance.

It is a further object of the present invention to provide improved electromechanical translators which provide translations over long distances in extremely short (viz. fine or high resolution) steps.

It is a still further object of the present invention to provide an improved electromechanical translator which is capable of actuating a load to move over steps which may be varied in size.

It is a still further object of the present invention to provide an improved electromechanical translator having a speed of travel which may be varied over a relatively wide range (say 1,000 to 1), as by varying the distance of successive steps of motion, thus varying the repetition rate of such steps.

It is a still further object of the present invention to provide an improved electromechanical translator which provides for translation in opposite directions of travel with freedom from backlash.

It is a still further object of the present invention to provide improved electromechanical translation apparatus affording programable motion (viz. motion in a predetermined manner with a sequence of motions in forward or reverse directions over selected distances in each direction).

It is a still further object of the present invention to provide an improved electromechanical translator device in which translation is accompanied by uniformity of motion without transients or other undesirable perturbation.

It is a still further object of the present invention to provide an electromechanical translator which is mechanically and thermally stable, even capable of operation at cryrogenic temperatures.

It is a still further object of the present invention to provide an improved electromechanical translator device which provides movements which are repeatable.

It is a still further object of the present invention to provide an improved electromechanical translator in which dimensional changes due to wear, thermal or load effect may be compensated.

It is a still further object of the present invention to provide an improved electromechanical translation device which provides reliable operation over a long operational lifetime.

Briefly described an electromechanical translation apparatus embodying the invention includes a housing and a body such as a shaft which is mounted in the housing for movement with respect thereto. There is also mounted in the housing and referenced to the housing, a piezoelectric driver. The driver has a plurality of sections which are disposed in end to end relationship along the shaft. At least one of the sections is in juxtaposition to the shaft and another of the sections is spaced from the shaft. Preferably the section which is spaced from the shaft is attached to the housing. In order to provide precise translatory motion of the shaft, voltage is applied to the section, which is in juxtaposition to the shaft, to bring it into engagement with the shaft. In other words, the voltage causes piezoelectric expansion; thus clamping the section on the shaft. Then a voltage is applied to the section which is spaced from the shaft. This voltage is preferably in the form of a staircase waveform which causes the central section to expand or contract in incremental steps, each step corresponding to a different step of the staircase waveform. The force due to the expansion or contraction of the piezoelectric driver is then transferred to the shaft by way of the clamped section of the driver. This force may also be transferred through the shaft to a load which can be accurately positioned or moved with a high degree of precision over the entire and relatively long distance over which the shaft may be driven.

The foregoing and other objects and advantages of the present invention will become more apparent from the reading of the following description in connection with the accompanying drawings in which.

Figures 1, 2, 4:
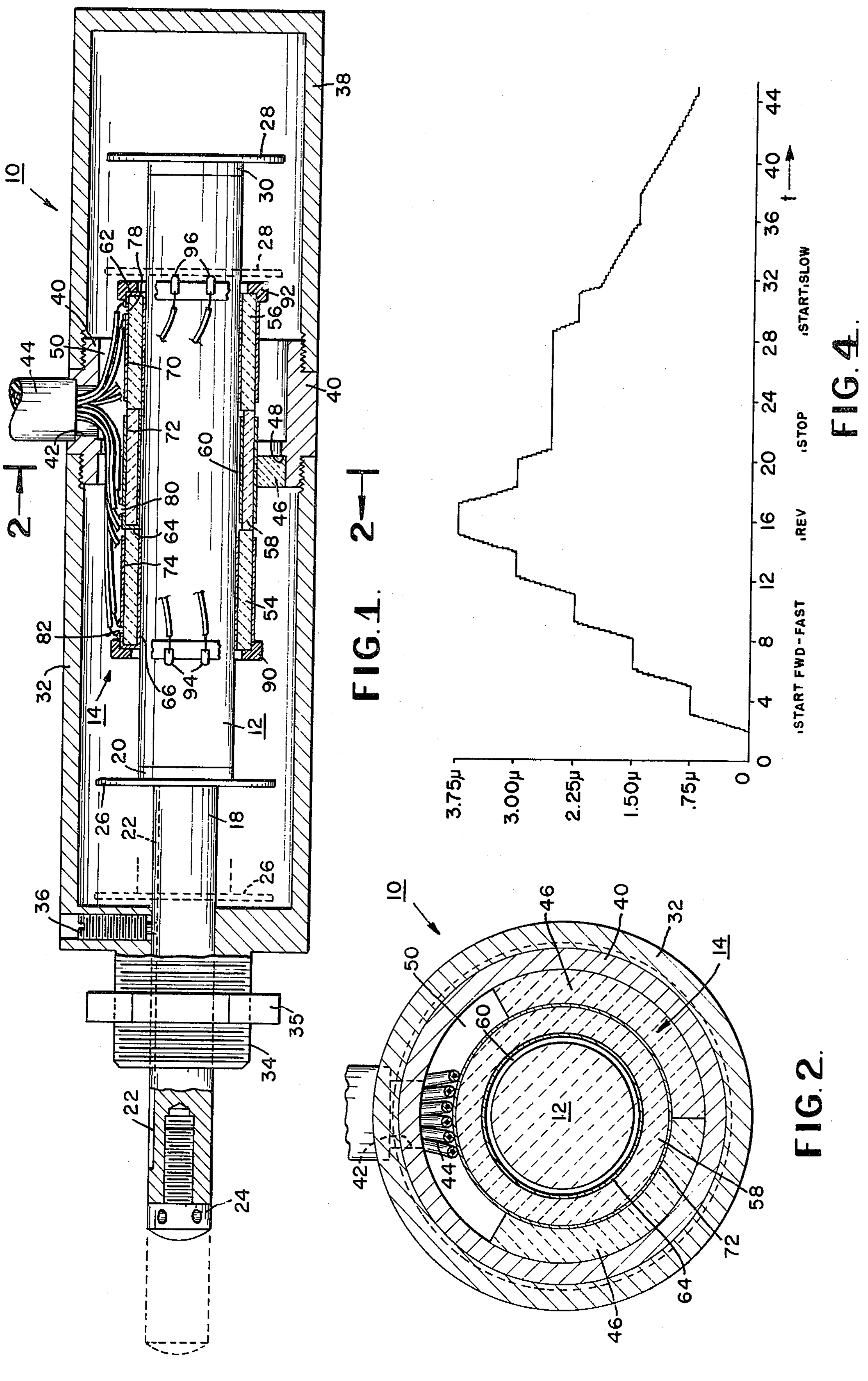
FIG. 1 is a longitudinal sectional view of an electromechanical translation device embodying the invention.
FIG. 2 is a sectional view of the device shown in FIG. 1, this section being taken along the line 2—2 in FIG. 1.
FIG. 4 shows a graph illustrating a typical sequence of motion which can be obtained with the device illustrated in FIGS. 1 and 2.

Referring more particularly to FIGS. 1 and 2 there is shown an electromechanical translator device having as its principal parts a cylindrical housing 10, a shaft 12 and piezoelectric driver 14. The driver 14 is referenced to the housing by being attached thereto via an assembly which includes a cylindrical tube 40 which is part of the housing 10.

The shaft 12 has attached to the front end thereof a spindle 18 which forms part of the shaft assembly. The shaft itself is a cylindrical rod preferably made of material having the same thermal coefficient of expansion as the piezoelectric material in the driver 14. A ceramic material which provides mechanical and thermal stability is suitable for use in the shaft 12. Preferably the material should be the same as used for the driver 14. The spindle 18 is preferably of metal and has a flange 20 which is attached to the forward end of the shaft 12 as by means of an adhesive, such as an epoxy adhesive. A metal having a low thermal coefficient of expansion is preferably used for the spindle 18; the metal sold under the trade name, Invar, being suitable. A groove or keyway 22 extends along the length of the spindle. A screw 24 may be inserted into the tip of the spindle and may be used for attachment of the spindle and therefore the shaft assembly to a load. It has been found that the device embodying the invention as herein illustrated is capable of actuating loads up to five pounds and thus may be used to position various types of hardware, such as optical mirrors and other precision mechanisms.

A ring 26, which may be a snap ring is located, as in a groove at the front of the flange 20. Another ring 28 which is provided as an end flange on a boss 30 is attached to the rear end of the shaft 12. These rings 26 and 28 are of conductive material and are parts of end limit switches for stopping the motion of the shaft in the forward and rearward direction.

The housing 10 includes a forward section 32, which like the other sections of the housing 10, is cylindrical in shape. The front of the section 32 may have a threaded reduced diameter portion 34 which provides for attachment, as by a nut 35, of the housing to a strand or other support for the device. A key in the form of a set screw 36 extends into the keyway groove 22 and constrains the shaft assembly 12 to longitudinal motion. The front end of the housing section 32 and the piezoelectric driver 14 thus support the shaft 12 in the housing. The rear end 38 of the housing 10 is a cylindrical cup which screws into the central cylinder 40 which is part of the driver 14 attachment assembly. The housing front section 32 also screws into the cylinder 40 to provide a unitary housing assembly. The cylinder 40 has an opening 42 through which cable leads 44 extend to make contact with the piezoelectric driver 14 and the limit switches. A sector shaped member 46, which may be of ceramic material is disposed on the forward end of the cylinder 40 and referenced against a shoulder 48 of that cylinder. The sector shaped member may be split into two members each occupying approximately 120° around the inner periphery of the cylinder 40. The outer periphery of the sectors 46 are secured, by means of an epoxy adhesive to the cylinder 40. The inner periphery of the sectors 46 are secured to the piezoelectric driver 14 preferably at the center (viz. the mid-point of the length) of the driver 14. An opening 50 is provided above the sectors 46 and along the upper portion of the cylinder 40 through which the leads may extend from the driver 14 into the cable 44.

The piezoelectric driver 14 is a cylindrical member or sleeve which surrounds the shaft 12. Although the driver may be constructed of a continuous solid cylinder, it is for ease of manufacture made up of a plurality of sections which are then attached in end to end relationship as by an epoxy adhesive. The front section 54 and the rear section 56 have a tight sliding fit with the shaft 12. The center section 58 has the same outer diameter as the other sections 54 and 56. The inner diameter of the center section 58 is larger than the inner diameter of the forward and rear sections 54 and 56 so as to provide a clearance 60 which is sufficiently large, such that even when the center section 58 is extended by piezoelectric action, the clearance 60 exists between the inner diameter of the central section 58 and the shaft. The sections 54, 58 and 56 are made desirably of ceramic type piezoelectric material, which may suitably be the lead zirconate-titanate material which is commonly known as PZT.

Electrodes are provided on the outer as well as on the inner peripheries of each of the sections 56 and 58. Silver which is fused to the ceramic sections 54, 56 and 58 is suitable. The electrodes 62, 64 and 66 on the inner periphery of the sections 56, 58 and 54, respectively may be brought around an end of the section to the outer periphery thereof where pads thereof are formed which are spaced from the electrodes 70, 72 and 74 on the outer surface by gaps 78, 80 and 82. Thus, the front section 54 has a pair of electrodes 66 and 74; the center section 58 has a pair of electrodes 64 and 72 and the rear section 56 has a pair of electrodes 62 and 70. Leads 44 are connected to each of these electrodes, as by soldering. These leads 44 are brought out of the housing 10 to form the cable.

The limit switches which include the rings 26 and 28 are provided by rings of insulating material 90 and 92 to which pairs of conductive tabs 94 and 96 are attached. As shown in dash lines, when the ring 28 makes contacts with the tabs 96 a switch closure results which indicates that the shaft 12 has moved to its maximum forward limit. Similarly a switch closure will result between the tabs 94 through the ring 26 when the shaft is in its rear limit position.

Figure 3:
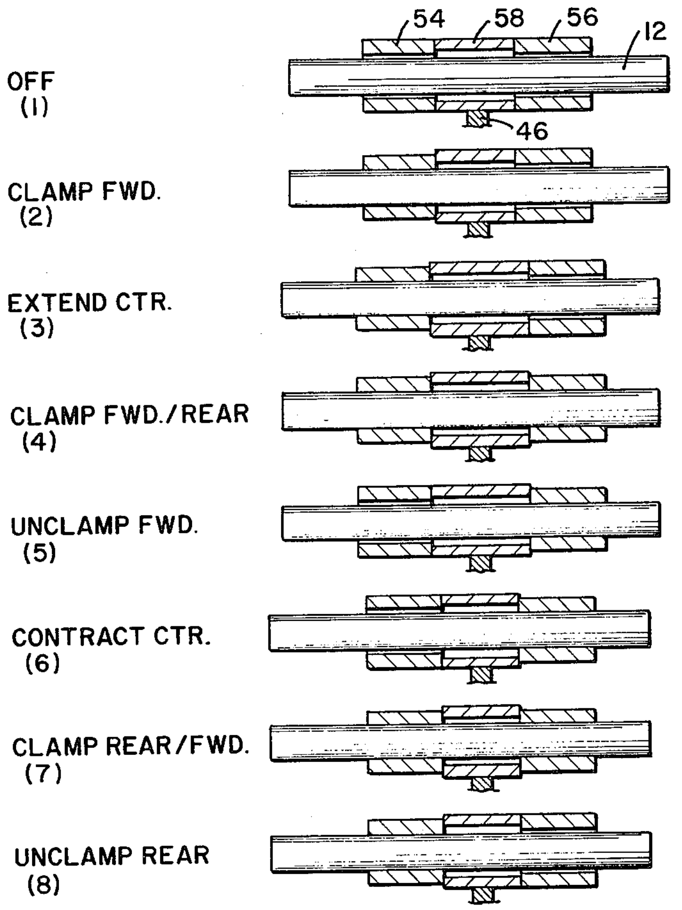
FIG. 3 shows a series of schematic presentations of the device shown in FIGS. 1 and 2 and illustrates the sequence of operation thereof.

The operation of the device shown in FIGS. 1 and 2 will be more apparent from FIG. 3. In the off position, (1) all three sections 54, 56 and 58 are released from the shaft 12. This occurs when voltage is disconnected and not applied to the section electrodes. To advance the shaft 12 in the forward direction (to the left) voltage is applied in the form of a clamping pulse or level to the forward section 54. The forward section then expands and engages the shaft 12. In other words, the forward section 54 next (2) clamps the shaft 12. Then (3) the voltage is applied to the center section 58. In a desired automatic mode of operation these steps take the form of a rising staircase waveform. This staircase waveform will be discussed in greater detail hereinafter in connection with FIG. 11. The center section then expands and extends longitudinally. Since the center section is referenced to the housing by being attached thereto via the sector 46, the clamped shaft will then be extended in the forward direction to the left. When the top of the staircase voltage waveform is reached, voltage is applied to the rear section 56. The rear section then (4) engages and clamps the shaft 12. Clamping voltage is continuously applied to the forward section 54. Thus, both the forward and rear sections are clamped simultaneously. Such simultaneous clamping provides a feature of this invention in affording uniformity of motion and avoiding transients or perturbations which might otherwise occur when the staircase waveform reverses direction. In the next step (5), the forward section 54 unclamps and releases the shaft 12. The rear section 56 remains clamped to the shaft. Also the high voltage applied to the center section 58 decreases in steps, thus causing the center section 58 to contract. As the center section contracts (6) the clamped shaft is extended further to the left in the forward direction. When the staircase waveform reaches its lower extreme, claimping voltage is again (7) simultaneously applied to the forward and rear sections 54 and 56. Again transient responses and perturbations are eliminated. In the final step (8) of the sequence, the rear section 56 is disconnected from the clamping voltage while the forward section 54 remains clamped. It will be observed that the driver 14 is now in the same condition as in the second step of the sequence. The third through seventh steps of the sequence are then repeated to further advance the shaft to the left.

The distance which the center section incrementally extends or contracts is a function of the amplitude of each step of the staircase voltage waveform. By increasing their amplitude, the steps may be increased in size. Conversely by decreasing the amplitudes, the steps may be made smaller. Also the staircase waveform may be generated continuously or each step may be provided individually, as by means of a manually controlled switch (114, FIG. 5). In this manner the steps may be varied continously say from 4 micrometers to 0.004 micrometers, or over a range of 1,000 to 1. The speed of travel of the shaft is then continuously variable, say from 25 millimeters of travel in 2.8 hours to 25 millimeters of travel in 60 seconds.

As shown in FIG. 4 the motion of the shaft is also continuously variable. The direction of motion is also controlable by changing the sequence in which the forward section 54 and the rear section 58 are clamped to the shaft with respect to the ascending and descending sides of the staircase waveform. It will be apparent from FIG. 3 that is the center section 58 is permitted to contract as by the application thereto of a descending staircase waveform on the second step, the shaft 12 will move rearwardly or to the right as shown in FIG. 3. The period of time during which clamping levels are applied to the forward and rear sections 54 and 56 simultaneously may also be infinitely varied thus the shaft may be retained stationary in any selected position. In other words, the shaft may be actuated in the forward direction, the reverse direction or stopped in any sequence, to position a load in any desired position over the entire travel, say 25 millimeters which may be provided with the device, and in addition, the distance travelled by the shaft during each incremental step may be varied in order to change the speed of travel or the resolution of positioning which is required.

Figure 5:
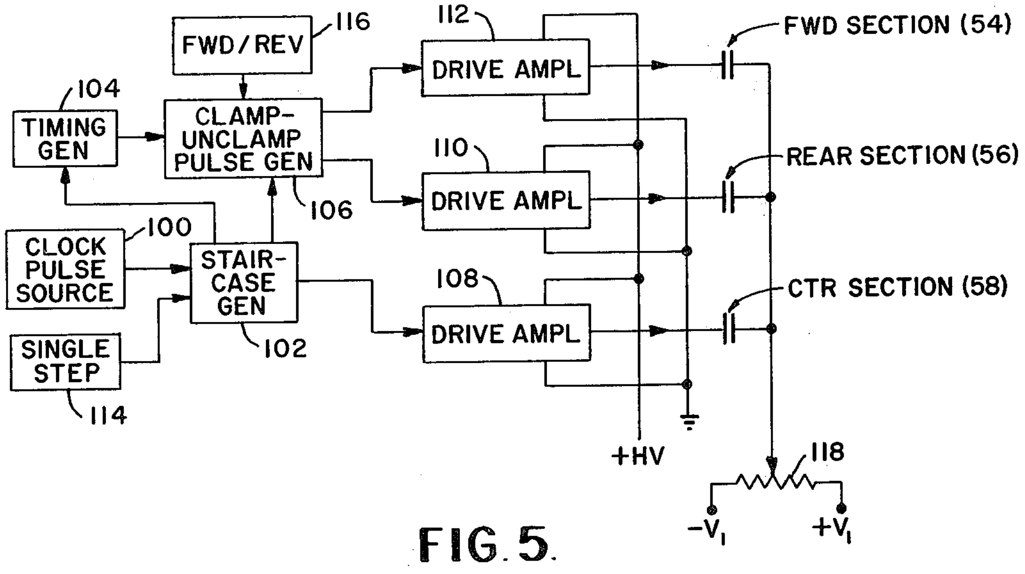
FIG. 5 is a block diagram illustrating the electronic circuit apparatus which may be used together with the device illustrated in FIGS. 1 and 2 to provide electromechanical translation apparatus in accordance with the invention.

FIG. 5 illustrates in general, the circuitry which may be associated with the device shown in FIGS. 1 and 2 which, together with that device, provides electromechanical translation apparatus embodying the invention. The principal circuit elements are a source of clock pulses 100 which may be provided by an oscillator the frequency of which may be varied, such variation and frequency also providing control over the speed of travel of the shaft 12, a staircase generator 102, a timing generator 104, a clamp unclamp pulse or level generator 106 and driver amplifiers 108, 110 and 112 which provide high, say about 600 volts, operating voltages or potentials across the center, rear and forward sections 58, 56 and 54 of the piezoelectric driver 14. In lieu of the clock pulses from the source 100 a circuit, such as a momentary action switch provides a single step generator 114 which causes the staircase to climb or descend a single step for each actuation thereof. The staircase generator affords the basic timing sequences for the apparatus by providing sequencing signals to the timing generator 104 when the top of the staircase and the bottom of the staircase is reached. The timing generator 104 responds to the sequencing pulses from the staircase generator 102 and applies a sequence of timing pulses to the clamp unclamp pulse generator 106. The staircase generator 102 also provides an output to the generator 106 indicating the direction or sense of the staircase, either ascending or descending. Depending upon the direction of travel selected, as by a forward, reverse switch 116, the clamp unclamp generator 106 provides operating pulses or levels to its associated drive amplifiers 110 and 112. These levels are applied to one (the outer) electrode of the forward and rear sections 54 and 56 of the driver 14. Similarly the staircase generator applies the staircase waveform to its drive amplifier 108, which then applies a high voltage staircase to the outer electrodes of the center section 58 of the driver. The other electrode, preferably the inner electrode, of the sections of the driver are connected to the center of a potentiometer 118. The opposite ends of the potentiometer are connected to sources of voltage indicated as $+V_1$ and $-V_1$. These voltages are equal and may be less than the maximum high voltage which is applied to the piezoelectric driver sections 54, 56 and 58. For example, if the high voltage is plus 600 volts then $V_1$ may suitably be 250 volts. Adjustment of the potentiometer 118 then applies a bias potential continuously to the piezoelectric driver sections causing them to expand or contract in order to accommodate and compensate for thermal effects, wear of the shaft or driver and for changes in load on the shaft. Thus, tighter engagement may be desired for heavier loads, with lighter engagement or clamping desired for lighter loads. Such adjustment may readily be accomplished by means of the potentiometer 118.

Figures 6, 7:
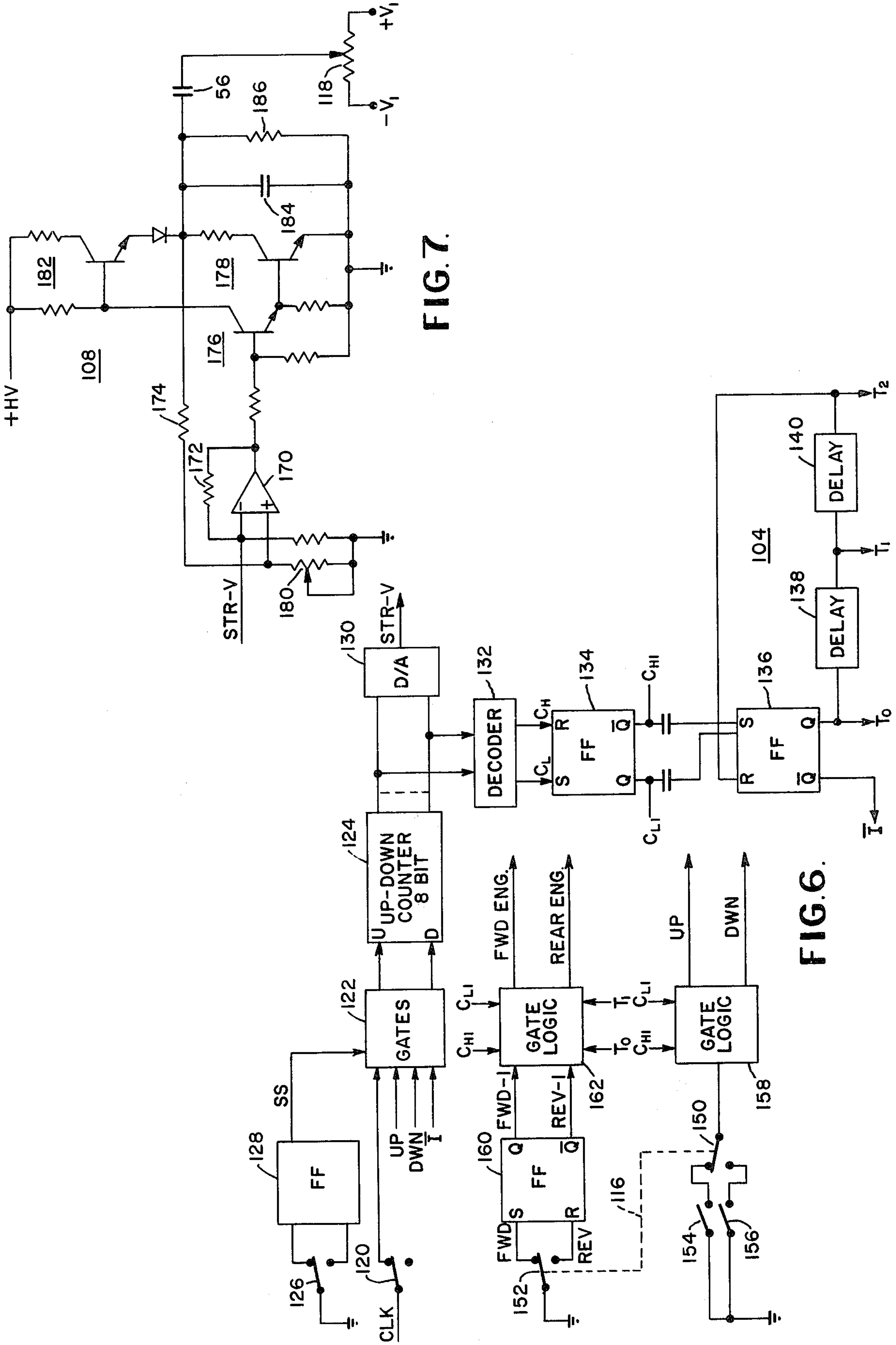
FIGS. 6 through 10 are more detailed block and schematic diagrams illustrating portions of the electronic circuit apparatus shown in FIG. 5.

The electronic circuitry for controlling the translator device is shown in greater detail in FIG. 6. Clock pulses are applied through a switch 120, which may be opened when manually controlled single step operation is desired. These clock pulses are applied to gates 122 which may be a pair of AND or NAND gates. Applied to different ones of these gates are up and down operating levels. Also applied to both gates is an inhibit level indicated as $\overline{I}$. When one of these gates 122 is enabled as by the up level, the clock pulses are applied to the up input of an up-down eight bit counter 124. Similarly when the down level is applied to the gates 122, the clock pulses will be applied to the down input of the counter 124. In the event that single step operation is desired a single step switch 126 is operated to pulse a flip-flop latch 128. This provides a single pulse to both gates 122 which serves in lieu of a clock pulse. This pulse will be applied to the up or down inputs of the counter depending upon which of the gates 122 is enabled. The output of the counter is applied to a digital to analogue converter 130 which translates the count into a staircase waveform which increases as the count increases and decreases as the count decreases. This waveform is illustrated in waveform (*a*) of FIG. 11. The count stored in the counter 124 is also applied to a decoder 132. This decoder decodes the count and provides an output $C_L$ when a count corresponding to the bottom of the waveform is reached, and $C_H$ when a count corresponding to the top of the waveform is reached. The count corresponding to the bottom of the waveform may, for example, be a count of 7 whereas the count corresponding the top of the waveform may be a count of 248. The outputs $C_H$ and $C_L$ are provided so long as the counter has a count of 7 or less or 248 or more, respectively.

A flip-flop latch 134 is set or reset by the decoder output $C_H$ and $C_L$ respectively. Thus the occurrence of the top or bottom limit, and which limit was last is stored in the flip-flop 134. The outputs $C_{H1}$ and $C_{L1}$ represent the condition that the bottom of the waveform or the top of the waveform, respectively, occurred last.

Figure 11:
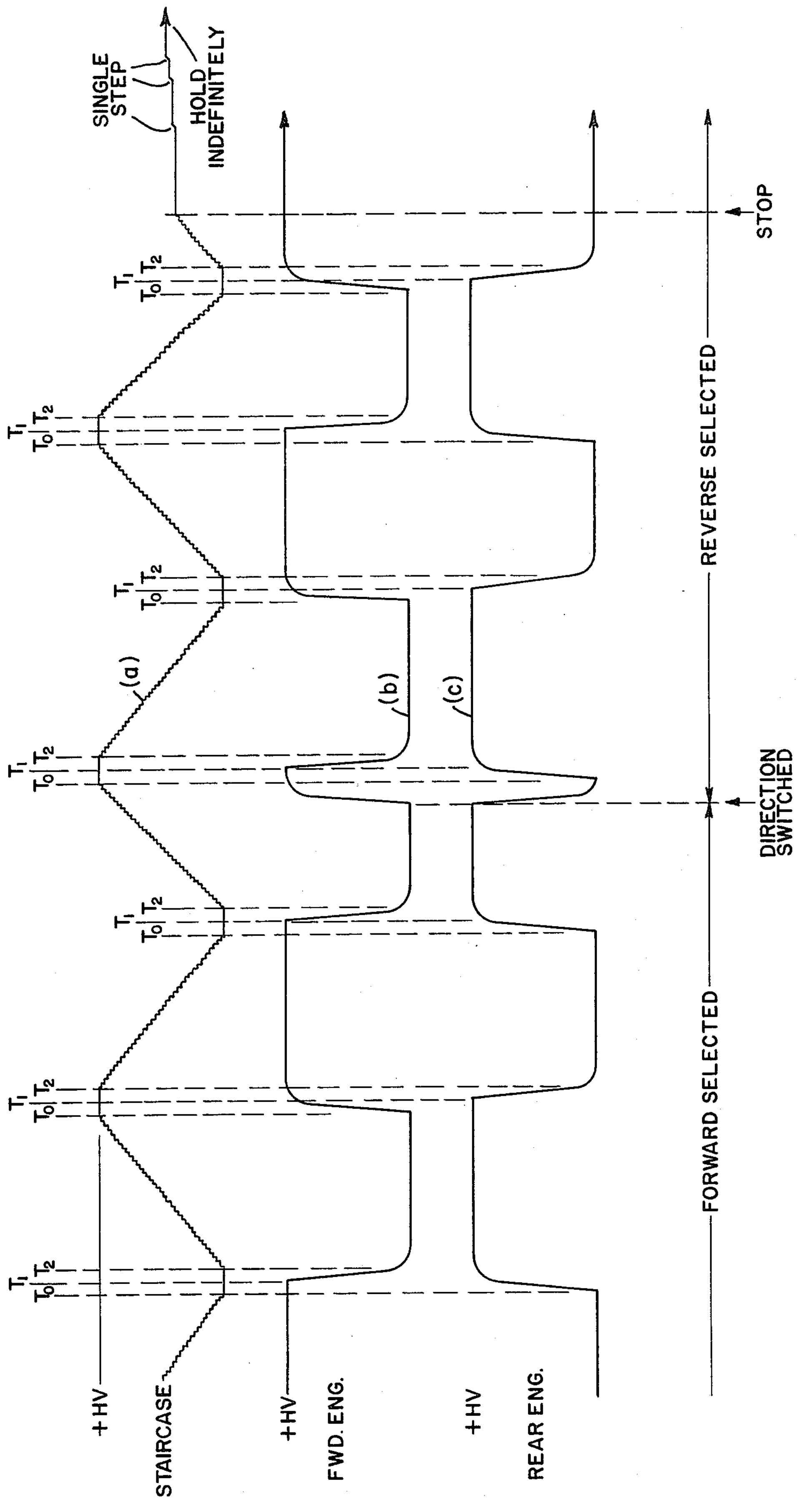
FIG. 11 is a timing chart illustrating an exemplary sequence of signals generated with the apparatus illustrated in FIGS. 5 through 10.

When the bottom of the waveform is reached, the flip-flop 134 is set and changes state. The leading edge of the pulse appearing at the Q output of the flip-flop is capacitivly coupled to another flip-flop latch 136 and sets that flip-flop. Similarly, when the top of the waveform is reached, the flip-flop 134 becomes reset and that condition also results in the flip-flop 136 becoming set. When the flip-flop 136 becomes set, it operates a delay line consisting of two delay circuits 138 and 140. The flip-flop 136 and the delay circuits 138 and 140 provide the timing generator 104. This timing generator produces three pulses which may be approximately 1 millisecond apart and are indicated at $T_0$, $T_1$ and $T_2$. Thus, a sequence of three pulses $T_0$, $T_1$ and $T_2$ occur upon occurrence of the bottom and top of the staircase waveform. The time relationship of these pulses is illustrated in FIG. 11. When the flip-flop 136 is set, the inhibit output, $\overline{I}$, which output is applied to the gates 122, is produced. When upon the occurrence of the last pulse $T_2$ the flip-flop 136 is reset. Accordingly for the duration $T_0$ through $T_1$ the gates 122 are inhibited and clock pulses are not applied to the counter 124. The staircase thus remains at a constant level either at its upper or lower limit for the period of time $T_0$ through $T_1$.

Figure 10:
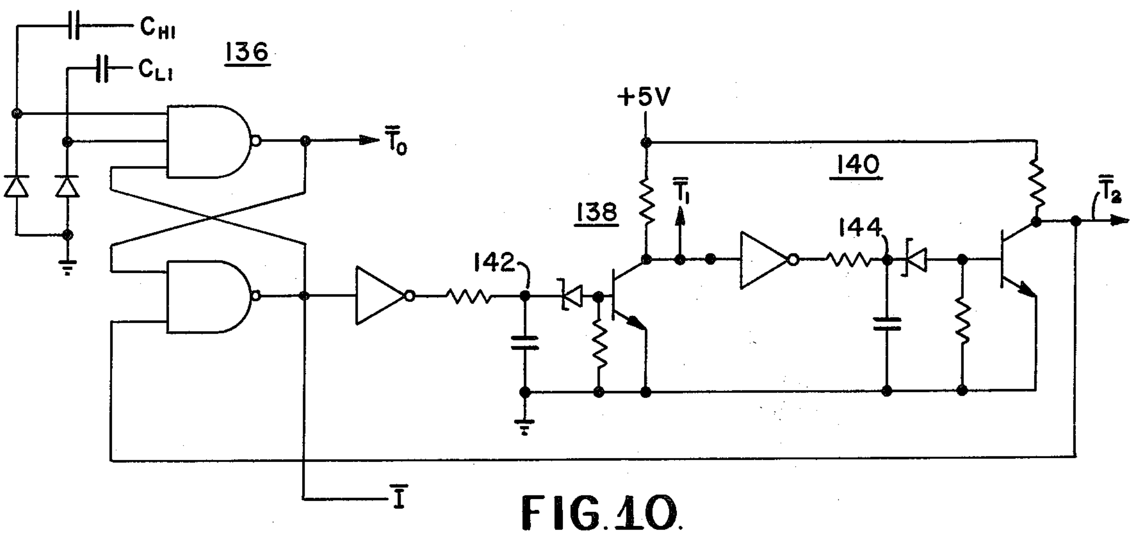

The circuitry of the timing generator is illustrated in FIG. 10. The flip-flop 136 may be implemented using conventional NAND logic techniques from a pair of NAND gates. Each delay circuit includes an RC network 142 and 144 which provides a time delay of approximately 1 millisecond. These circuits provide saturating levels to amplifier stages which provide the $\overline{T}$, and $\overline{T}_2$ bar pulses.

Figure 8:
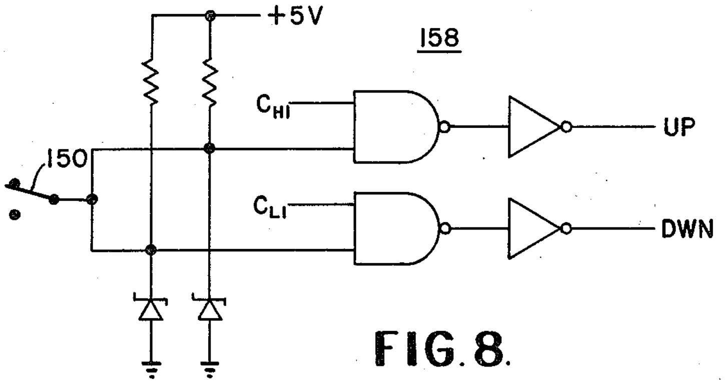

The slope of the staircase waveform is selected by a forward and reverse switch 116 consisting of two switch sections 150 and 152 which are ganged together. The switch section 150 operates in conjunction with the forward and rear limit switches 154 and 156 which are provided by the rings 26 and 28 and their cooperating contacts 94 and 96 (FIG. 1). Either the forward or reverse direction may be manually selected by operating the switch 116. The switch 150 and the switches 154 and 156 apply ground to gate logic 158. Also applied to the logic are the outputs $C_{H1}$ and $C_{L1}$ which indicate the slope of the last or succeeding portion of the staircase. The limit switches 154 and 156 assure that the gate logic will be inhibited from applying a upward count if the forward limit switch is closed and a down count if the upper limit switch is closed. This will insure that the shaft does not move beyond the limits set by the switches 154 and 156. Accordingly either the up or down output of the logic 158 will be provided depending upon which direction is selected and the slope of the staircase previously used (viz. whether the center section 58 is in expanded or contracted condition). The gate logic 158 may be implemented using conventional TTL logic techniques using NAND gates and inverters as shown in FIG. 8.

Figure 9:
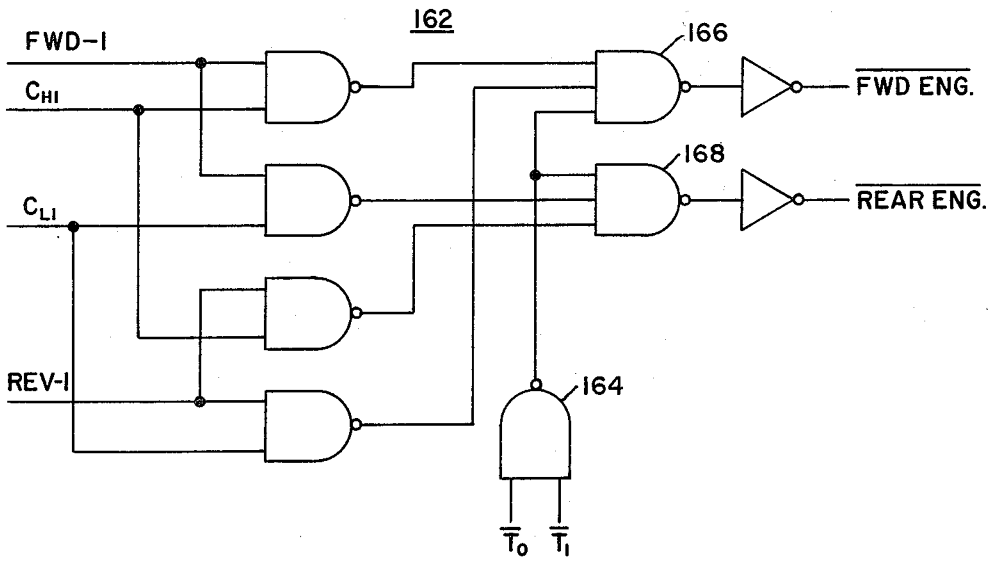

The clamp unclamp pulse generator 106 is provided by a flip-flop latch 160 and gate logic 162. The direction selected by the switch 152 is stored in the flip-flop 160. When forward motion is selected the flip-flop Q output provides a FWD-1 level to the gate logic 162. Conversely when reverse is selected the Q output of the flip-flop 160 provides an REV-1 level to the logic 162. The logic 162 also receives timing pulses $T_0$ and $T_1$ from the timing generator 104 and the slope memory flip-flop 134 outputs $C_{H1}$ and $C_{L1}$. Clamping or engaging pulses indicated as FWD ENG and REAR ENG are outputted by the logic 162. These pulses are illustrated for representative cases when forward or reverse motion is selected in FIG. 11. During the time period from $T_0$ to $T_1$ both the FWD ENG and the REAR ENG pulses are high which provides for simultaneous clamping of the shaft by the forward and rear driver sections 54 and 56. The sequence of operations thus explained in connection with FIG. 3 is obtained. The gate logic 162 may be implemented in accordance with conventional TTL logic techniques by NAND gates and inverters as shown in FIG. 9. One millisecond after the period from $T_0$ to $T_1$, the timing pulse $T_2$ occurs, which as shown in FIG. 6, removes the inhibiting level $\overline{I}$ from the gates 122. Also the levels $\overline{T}_0$ and $\overline{T}_1$ which are applied to and NAND gate 164 (FIG. 9) are no longer applied to the output gates 166 and 168 thus permitting the FWD-1 and REV-1 and the $C_{H1}$ and $C_{L1}$ levels to solely control the generation of the FWD ENG and REAR ENG clamping pulses (viz. only one of these pulses will then be of such a level as to drive either the forward or rear section of the piezoelectric driver 14 into engagement with the shaft 12).

As shown in FIG. 11 single pulses or steps may be applied to the counter which then result in single step incremental movement in the direction selected by the forward reverse switches 116.

FIG. 7 illustrates the driver amplifier 108 which responds to the staircase generator voltage STR-V and produces high voltage staircase waveforms on the center section 58 of the driver 14. The staircase voltage is applied to the inverting input of an operational amplifier 170. This operational amplifier is provided with a first negative feedback loop including a resistor 172 and a second negative feedback loop including a resistor 174 and utilizing a two stage transistor amplifier 176 and 178. The negative feedback voltage is applied across a potentiometer 180. By adjusting the potentiometer the amount of negative feedback voltage can be increased or decreased thus increasing or decreasing the amplification provided by the operational amplifier 170. In the event that larger amplitude steps of the staircase waveform are desired, the amplification of the amplifier 170 is increased and in the event that smaller steps are desired the amplification is decreased by adjusting the potentiometer 180. Accordingly the incremental steps of motion of the shaft may be increased or decreased in order to obtain the desired resolution (or fine degree) of motion desired from the translator device.

The amplifier includes another transistor state 182. The transistor stages 178 and 182 are both driven by the transistor stage 176 in a push pull mode thus providing highly linear operating voltages throughout the entire range of staircase voltage. An output circuit including a capacitor 184 and a resistor 186 couple the amplifier output to the center section 58 of the driver. The bias voltage is supplied by way of the potentiometer 118 as explained above in connection with FIG. 5.

The drive amplifier 110 and the drive amplifier 112 which provides the clamp pulses or levels to the forward and rear sections 54 and 56 of the driver 14 may contain push pull amplifier stages similar to the stages 176, 178 and 182 shown in FIG. 7.

From the foregoing description it will be apparent that there has been provided improved electromechanical translation apparatus. While an electromechancial translator device and its associated control electronic circuitry has been described herein in order to illustrate the invention, it will be appreciated that variations and modifications of the herein described device and circuity, within the scope of the invention, will undoubtedly suggest themselves to those skilled in the art. Accordingly the foregoing description should be taken merely as illustrative and not in any limiting sense. I claim:

1. Electromechanical translation apparatus which comprises:

a. a housing, b. a body movable with respect to said housing, c. a piezoelectric driver in said housing and attached thereto, said driver having a plurality of sections disposed in end to end relationship, at least one of said sections being in juxtaposition to said body and another of said sections being spaced from said body, only said other section being referenced to said housing by being attached thereto, and d. means for applying voltage to said one section to bring said one section into engagement with said body and for also applying voltage to said other section for changing the length thereof whereby to apply force to said body for translating said body with respect to said housing.

2. The invention as set forth in claim 1 wherein said piezoelectric driver has three sections, the front and rear ones of said sections being disposed in juxtaposition with said body and the central one of said sections being spaced laterally from said body, and wherein said voltage applying means includes means for alternatively applying voltage to said front and rear sections to bring one of said front and rear sections at a time into engagement with said body and for alternatively applying voltage of opposite polarity to said central section for translating said body selectively in opposite directions with respect to said housing.

3. The invention as set forth in claim 2 wherein said central section is attached to said housing.

4. The invention as set forth in claim 3 including means attached to said central section at the center thereof for attaching said central section to said housing.

5. The invention as set forth in claim 1 wherein said body is a shaft axially disposed in said housing, and wherein said driver is a sleeve around said shaft, said shaft being reciprocally mounted in said sleeve.

6. The invention as set forth in claim 5 wherein the longitudual portion of said shaft which is surrounded by said sleeve and which extends beyond said sleeve at least over the travel of said shaft is of non-conductive material, said sleeve having conductive material on the inner and outer peripheral surfaces thereof to provide electrodes on said sleeve.

7. The invention as set forth in claim 6 including means for applying a constant voltage to said electrodes for changing the inner diameter of said sleeve for adjusting the clearance between said sleeve and said shaft to adjust for wear, thermal dimensional changes, load conditions and the like.

8. The invention as set forth in claim 6 wherein said sections of said driver comprise three successive cylindrical elements, the central one of which having its opposite ends attached to an end of the front and rear one of said elements, respectively, said central element having inner diameter greater than the inner diameter of said front and rear elements, said elements each having separate layers of conductive material on the inner and outer surfaces thereof for providing separate pairs of electrodes one on the inner and the other on the outer surface of each of said elements.

9. The invention as set forth in claim 6 including switch means operatively associated with said shaft and with said sleeve at the opposite ends thereof for providing switch contact when said shaft reaches the ends of travel thereof.

10. The invention as set forth in claim 5 including a spindle shaped member attached to one end thereof and extending longitudinally from said shaft one end and out of said housing.

11. The invention as set forth in claim 10 including a longitudial groove in said spindle, and a key member in said housing extending radially into said groove for limiting rotational movement of said spindle and shaft.

12. The invention as set forth in claim 1 wherein said voltage applying means includes means for applying a staircase voltage to said other section for changing its length in incremental steps and for thereby translating said body in incremental motion steps corresponding thereto.

13. The invention as set forth in claim 12 wherein said staircase voltage applying means comprises a staircase voltage generator, and means for changing the voltage amplitude of the steps of said staircase whereby to change the length of said steps of incremental motion.

14. The invention as set forth in claim 2 wherein said voltage applying means includes pulse generator means for applying voltages to said front and rear sections, and staircase voltage generating means for applying voltage to said central section.

15. The invention as set forth in claim 12 including timing generator means responsive to said staircase voltage for operating said pulse generator means to provide said pulses in a sequence in which pulses are applied first to one of said front and rear sections, second to both of said front and rear sections simultaneously and third to the other of said front and rear sections, and for operating said staircase generator to provide a staircase voltage to said central section only during said first and third parts of said sequence.

16. The invention as set forth in claim 6 wherein said sleeve and shaft portion are of the same material.

17. The invention as set forth in claim 16 wherein said material is ceramic piezoelectric material.

* * * * *